W. L. CRAIG.
ATTACHMENT FOR MOTORCYCLES.
APPLICATION FILED JULY 17, 1920.
1,388,805.
Patented Aug. 23, 1921.
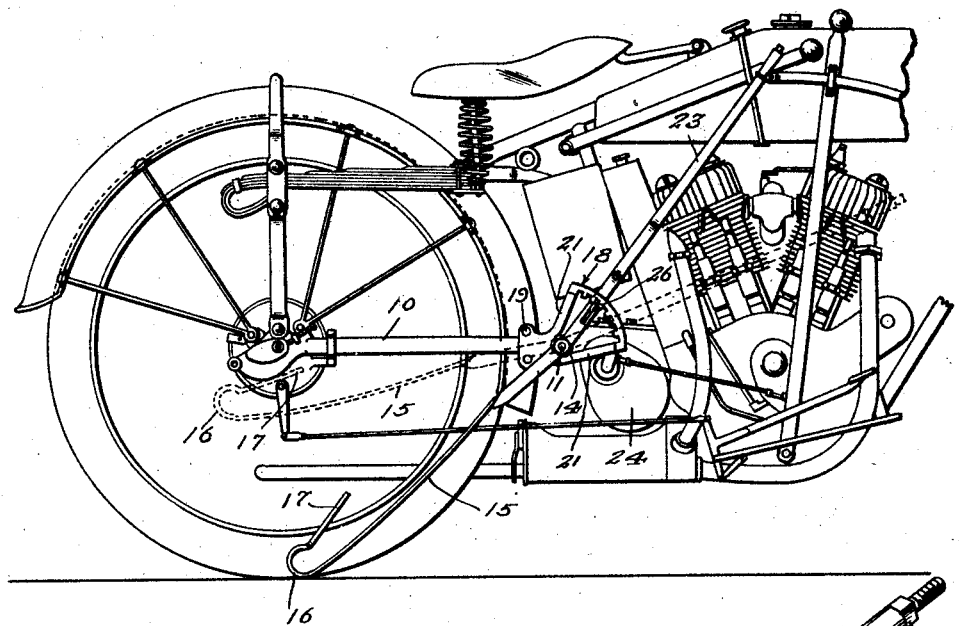
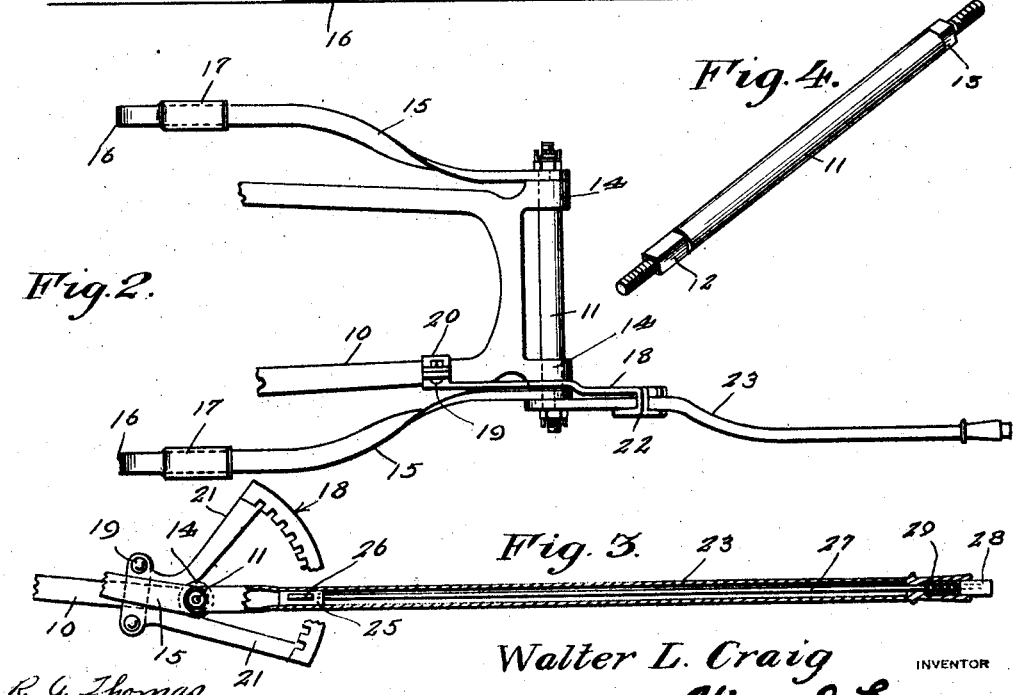
Walter L. Craig, INVENTOR
BY *Victor J. Evans*
ATTORNEY
WITNESSES
R. G. Thomas

UNITED STATES PATENT OFFICE.

WALTER L. CRAIG, OF WASHINGTON, DISTRICT OF COLUMBIA.

ATTACHMENT FOR MOTORCYCLES.

1,388,803.  Specification of Letters Patent.  Patented Aug. 23, 1921.

Application filed July 17, 1920. Serial No. 397,014.

*To all whom it may concern:*

Be it known that I, WALTER L. CRAIG, a citizen of the United States, residing at Washington, in the District of Columbia, have invented new and useful Improvements in Attachments for Motorcycles, of which the following is a specification.

This invention relates to attachments for motorcycles and has for an object the provision of novel means for supporting the motorcycle when the latter is standing, which means may be operated from the rider's seat.

Another object is the provision of a support which, when not in use for the purpose of supporting the motorcycle, may be used as a foot rest for a passenger occupying a seat at the rear of the operator's seat and which in addition may be lowered while the motorcycle is under way for use as a brake.

Other objects and advantages of the invention will appear as the following description is read in connection with the accompanying drawings.

In the drawings:—

Figure 1 is a fragmentary elevation of a motorcycle with the invention applied thereto, the latter being shown in use as a support by full lines and in position to provide a foot rest by dotted lines.

Fig. 2 is a fragmentary plan view showing the manner of securing the invention to the motorcycle.

Fig. 3 is an enlarged fragmentary view partly broken away illustrating the means of holding the device in adjusted position.

Fig. 4 is a detailed view of the pivot bar upon which the supports are maintained.

Referring to the drawings in detail, wherein like characters of reference denote corresponding parts, the reference character 10 indicates the rear forks of a motorcycle of the type wherein the said forks are pivotally connected to the main portion of the frame. In securing the invention to the motorcycle, the usual pivot bar which provides for the connection of the rear forks with the main portion of the motorcycle frame is removed and a pivot bar 11 substituted. This latter bar is provided at each end with rectangular portions 12 and 13 which extend beyond the bearings 14 of the forks 10 and have mounted thereon the inner ends of preferably curved arms or levers 15, the latter being provided with rectangular openings so as to fit the portions 12 and 13 of the pivot bar 11.

Near the outer ends of the arms or levers 15, there is provided curved or rounded portions 16 which are adapted to contact with the ground when the arms or levers are used as a support, while the extremities of these arms or levers are widened to provide foot rests 17, which, when the arms or levers 15 are elevated to the position shown by the dotted lines in Fig. 1, serve as rests for the feet of the passenger riding upon a rear seat (not shown).

Secured upon one member of the rear forks 10 is a toothed segment 18, the latter being provided with apertured ears for the passage of bolts or other fastening devices 19, which engage a strap 20 which embraces said member of the rear forks. The toothed segment 18 is provided with an opening for the passage of the pivot bar 11 and outwardly extending arms 21 serve as a connection with the toothed portion of the segment, the said portion being bent over as indicated at 22 in Fig. 2.

Extending through the segments 18 and mounted upon the rectangular portion 12 of the pivot bar 11 is one end of an operating lever 23, the said end being provided with a rectangular opening which receives the portion 12. The segment 18 is offset as shown in Fig. 2 so as to clear the crank case 24 of the motorcycle, while the lever 23 is also offset to provide for its free movement. The said lever 23 is hollow and mounted for sliding movement in this lever is a member 25, which carries a lug 26 which is adapted to engage the teeth of the segment 18. The member 25 is spring actuated and for this purpose is provided with a rod 27 which extends through the bore of the lever 23 and has an operating handle 28 secured to its outer end. Positioned between the end of this handle and a shoulder formed within the lever 23 is a coiled spring 29 which serves to normally hold the lug 26 in engagement with the toothed segment 18.

In the use of the invention as a support, the operating lever 23 is adjusted to bring the arms or levers 15 into engagement with the ground and held in such adjusted position through the engagement of the lug 26 with the teeth of the segment 18. If desired, the rear wheel of the motorcycle may be elevated from contact with the ground and the lever 23 further adjusted to maintain the said wheel in elevated position. As before stated when the parts are in the position shown by the dotted lines in Fig. 1, the device may be utilized as a foot rest. It will be apparent that the invention may be operated without the necessity of the rider lifting his seat but by merely raising or lowering the operating lever 23.

The invention is susceptible of various changes in its form, proportions and minor details of construction and the right is herein reserved to make such changes as properly fall within the scope of the appended claims.

Having described the invention what is claimed is:

1. An attachment for motorcycles comprising a pair of levers mounted for pivotal movement upon the frame of a motorcycle upon opposite sides of the rear wheel, said levers including curved ground engaging portions and relatively wide extremities, to provide foot rests and means whereby the levers may be adjusted for either use.

2. The combination with a motorcycle having a frame including a pivotally mounted rear fork, a lever mounted upon each side of the frame upon the pivot of said rear fork, a toothed segment secured to the frame, an additional lever also secured upon the rear pivot whereby the first mentioned levers may be adjusted to provide a support or to form a foot rest and means carried by said additional lever for engagement with the segment to hold the levers in position.

In testimony whereof I affix my signature.

WALTER L. CRAIG.